US011608059B2

(12) United States Patent
Parks et al.

(10) Patent No.: US 11,608,059 B2
(45) Date of Patent: Mar. 21, 2023

(54) METHOD AND APPARATUS FOR METHOD FOR REAL TIME LATERAL CONTROL AND STEERING ACTUATION ASSESSMENT (71) Applicant: GM GLOBAL TECHNOLOGY OPERATIONS LLC, Detroit, MI (US)

(72) Inventors: Jeffrey S. Parks, Ann Arbor, MI (US); Paul A. Adam, Milford, MI (US); Gabriel T. Choi, Novi, MI (US); Braden J. Swantick, Canton, MI (US); Michael J. Godfrey, Munich (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 16/551,122

(22) Filed: Aug. 26, 2019

(65) Prior Publication Data
US 2021/0061270 A1 Mar. 4, 2021

(51) Int. Cl.
*B60W 30/12* (2020.01)
*B60W 10/04* (2006.01)
*B60W 10/20* (2006.01)
*B60W 10/18* (2012.01)

(52) U.S. Cl.
CPC ............ *B60W 30/12* (2013.01); *B60W 10/04* (2013.01); *B60W 10/18* (2013.01); *B60W 10/20* (2013.01); B60W 2520/10 (2013.01); B60W 2520/14 (2013.01); B60W 2555/60 (2020.02); B60W 2710/18 (2013.01); B60W 2710/20 (2013.01); B60W 2720/106 (2013.01)

(58) Field of Classification Search
CPC ...... B60W 30/12; B60W 10/04; B60W 10/18; B60W 10/20; B60W 2555/60; B60W 2520/10; B60W 2520/14; B60W 2710/18; B60W 2710/20; B60W 2720/106
See application file for complete search history.

(56) References Cited

U.S. PATENT DOCUMENTS

| 5,948,027 A | * | 9/1999 | Oliver, Jr. | .......... B60G 17/0152 280/5.506 |
| 6,895,318 B1 | * | 5/2005 | Barton | .................. B60T 8/1755 701/41 |
| 2013/0253767 A1 | * | 9/2013 | Lee | ........................ B60W 50/04 701/42 |
| 2019/0179330 A1 | * | 6/2019 | Oniwa | ............... G01C 21/3407 |
| 2020/0348137 A1 | * | 11/2020 | Jain | ....................... G01C 25/005 |

* cited by examiner

Primary Examiner — Nicholas Kiswanto
Assistant Examiner — Jamal A Shah
(74) Attorney, Agent, or Firm — Lorenz & Kopf LLP (57) ABSTRACT

The present application relates to a method and apparatus for real time lateral control and steering actuation assessment for a motor vehicle by determining a desired host vehicle path, establishing a control point along the host vehicle path, generating a motion path between a host vehicle location and the control point, estimating a theoretical acceleration of the host vehicle along the motion path, controlling the host vehicle along the motion path, receiving a measured acceleration from an inertial measurement unit within the host vehicle, generating an error term in response to a comparison of the motion path and the measured lateral travel, and adjusting the performance limits of the sub-features in response to the error term.

18 Claims, 5 Drawing Sheets

METHOD AND APPARATUS FOR METHOD FOR REAL TIME LATERAL CONTROL AND STEERING ACTUATION ASSESSMENT

BACKGROUND

The present disclosure relates generally to programming motor vehicle control systems. More specifically, aspects of this disclosure relate to systems, methods and devices for performing a real time assessment of steering actuation and lateral control and limiting of feature control in response to the assessment in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

In performing the automated driving function, the ADAS is operative to control steering, braking and throttle of the host vehicle in order to control the vehicle along the prescribed motion path in avoidance of proximate vehicles and other obstacles. Feedback on vehicle control performance is critical for ensuring the ADAS safely performs the required maneuvers. Occupant comfort is a further consideration so vehicle braking, acceleration and turns functions should be made accordingly. To ensure safe and comfortable operations, the ADAS should detect when deviations from the intended motion path do occur and compensate for these deviations. Inaccurate vehicle control, including steering actuator operation may result in inefficient vehicle operation, vehicle damage, or vehicle to vehicle contact. It would be desirable to overcome these problems to provide a method and apparatus for real time lateral control and steering actuation assessment in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor to detect a vehicle lane marker, an inertial measurement unit for measuring a measured acceleration of a host vehicle, a processor operative to establish a control point in response to the vehicle lane marker, to generate a motion path between a current location of the host vehicle and the control point, and to generate a control signal indicative of the motion path to couple to the vehicle controller, the processor being further operative to compare the measured acceleration of the host vehicle to a theoretical acceleration determined in response to the motion path and to generate an error term in response to a difference between the theoretical acceleration and the measured acceleration, and a vehicle controller to control the host vehicle in response to the control signal and the error term.

In accordance with another aspect of the present invention further operative to disable an assisted driving operation in response to the error term.

In accordance with another aspect of the present invention further operative to prevent an assisted driving operation from being initiated in response to the error term.

In accordance with another aspect of the present invention wherein the sensor includes a camera mounted to the host vehicle.

In accordance with another aspect of the present invention further operative to determine a centerline of a vehicle lane and the control point is established on the centerline.

In accordance with another aspect of the present invention wherein the error term is determined in response to a plurality of measured accelerations and a plurality of theoretical accelerations along the motion path.

In accordance with another aspect of the present invention operative to perform a lane centering assisted driving function.

In accordance with another aspect of the present invention, a method performed by a processor including determining a desired host vehicle path, establishing a control point along the host vehicle path, generating a motion path between a host vehicle location and the control point, estimating a theoretical acceleration of the host vehicle along the motion path, controlling the host vehicle along the motion path, receiving a measured acceleration from an inertial measurement unit within the host vehicle, generating an error term in response to a comparison of the theoretical acceleration and the measured acceleration, and controlling the host vehicle along the desired host vehicle path in response to the error term.

In accordance with another aspect of the present invention wherein the error term is indicative of a difference between the motion path and an operation path performed by the host vehicle.

In accordance with another aspect of the present invention wherein the desired host path is determined in response to an initiation of an assisted driving function.

In accordance with another aspect of the present invention wherein the desired host path is determined in response to an initiation of a lane centering operation.

In accordance with another aspect of the present invention wherein an assisted driving function is disabled in response to the error term.

In accordance with another aspect of the present invention further including generating a driver take over request in response to the error term.

In accordance with another aspect of the present invention wherein the error term is determined in response to a plurality of measured accelerations and a plurality of theoretical accelerations along the motion path.

In accordance with another aspect of the present invention further including preventing an assisted driving operation from being initiated in response to the error term.

In accordance with another aspect of the present invention furthering including detecting a road lane marker and wherein the desired host vehicle path is determined in response to the road lane marker.

In accordance with another aspect of the present invention wherein the control point is determined in response to a host vehicle location and a host vehicle location.

In accordance with another aspect of the present invention wherein the motion path is determined in response to a prior error term.

In accordance with another aspect of the present invention, an advanced driver assistance system for controlling a host vehicle including a camera for capturing an image including a vehicle lane indicator, an inertial measurement unit to measure a first host vehicle acceleration and a second host vehicle acceleration, a vehicle controller for controlling the host vehicle along a motion path in response to a control signal, and a processor for generating the motion path, for generating the control signal representative of the motion path, for estimating a first theoretical acceleration and a second theoretical acceleration for the host vehicle along the motion path, for receiving the first host vehicle acceleration and the second host vehicle acceleration and for generating an error term in response to the first theoretical acceleration, the second theoretical acceleration, the first host vehicle acceleration and the second host vehicle acceleration, the processor being further operative to disable an assisted driving function in response to the error term exceeding a threshold value.

In accordance with another aspect of the present invention further including a user interface for receiving an user request for an assisted driving function and wherein the motion path is generated in response to the user request.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present application relates to a method and apparatus for real time lateral control and steering actuation assessment for a motor vehicle by determining a desired host vehicle path, establishing a control point along the host vehicle path, generating a motion path between a host vehicle location and the control point, controlling the host vehicle along the motion path, integrating velocities and yaw rate from an inertial measurement unit within the host vehicle, calculating the lateral movement along the path, generating an error term in response to a comparison of the motion path and the measured lateral travel, and adjusting the performance limits of sub-features in response to the error term.

For example, first a point a short distance on the vehicle motion path is selected. A path prediction provides how much lateral the vehicle should travel in a given time. The system then measures the difference between the actual travel and the predicted travel and compares the two. For example, the motion path predicts that 40 m in front of the vehicle, the vehicle should move laterally 1m to the right. After traveling the 40 m the system is next operative to how much the vehicle actually moved, let's say we moved 0.8 m. The system then compares the predicted path vs actual travel. 1 m-0.8 m, giving us an error term of 0.2 m. In this example, the lateral controller missed its target by 0.2 m.

Figure 1:
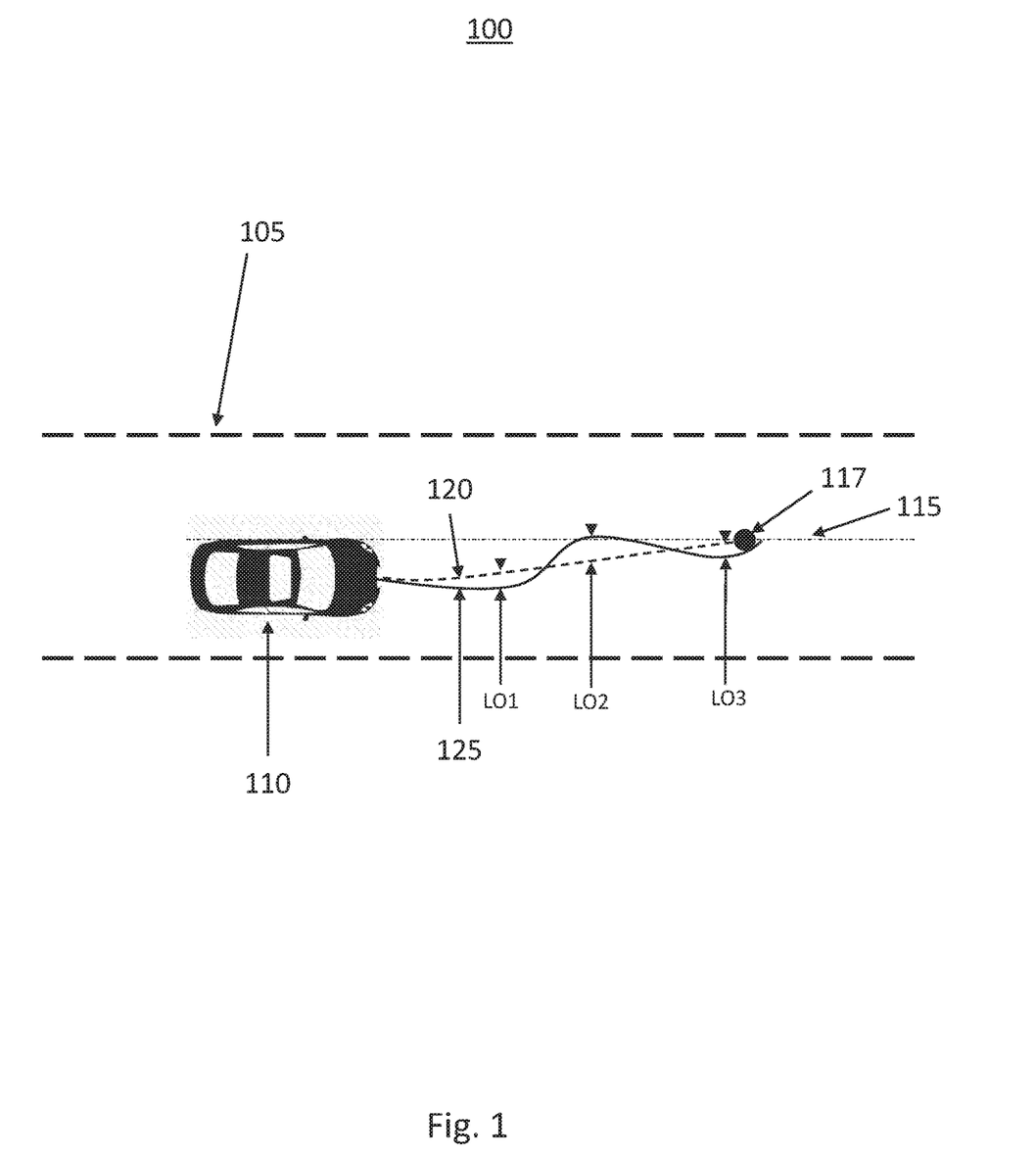
FIG. 1 shows an operating environment for real time lateral control and steering actuation assessment for a motor vehicle according to an exemplary embodiment.

FIG. 1 schematically illustrates an operating environment 100 for real time lateral control and steering actuation assessment for a motor vehicle 110. In this exemplary embodiment of the present disclosure, the host vehicle 110 is traveling within a vehicle lane 105 on a road or freeway. The centerline 115 of the lane is shown in this exemplary embodiment as a desired lateral lane position. The ADAS with the host vehicle is operative to establish a control point 117 along the centerline 115 where the host vehicle 110 path will join with the centerline 115. A desired motion path 120, shown as a dashed line, is generated by the ADAS for the host vehicle to follow to safely and comfortably merge with the centerline 115 at the control point 117. The actual vehicle travel path 125, shown as a solid line, illustrates the actual path traveled by the host vehicle 125 while attempting to follow the desired motion path 120. The lateral deviations LO1, LO2, LO3, or path error, between the desired motion path 120 and the actual vehicle travel path 125 are determined at various times during the maneuver in response to an output from an inertial measurement unit (IMU) within the host vehicle.

According to an exemplary embodiment, the ADAS algorithm is operative to evaluate, in real time, the quality of the control and actuation system used during lateral control of the host vehicle to an intended path. This enables the ADAS control system to observe in real time the accuracy of a host vehicle feedback controller and a host vehicle actuation system at following the desired motion path 120. To detect and quantify the path error, the ADAS algorithm is operative to determine the host vehicle movement over a time window, compare that to the desired motion path 120, and generates an error term. Vehicle lateral travel is measured by integrating velocities and yaw rate from the IMU.

Additionally, the ADAS algorithm may be operative to adjust one or more performance limits of lateral control sub-features based on real time assessment of lateral control quality. Traditionally, all lateral control sub-features are either available or deactivated at same time regardless of ability to execute individual sub-features. In an exemplary embodiment, real-time availability and performance limiting of sub-features may be implemented based on assessed control quality determined in response to a magnitude of measured lateral path error. These sub-features may include lane centering, dynamic offset, lane change on demand, trailering, etc.

Figure 2:
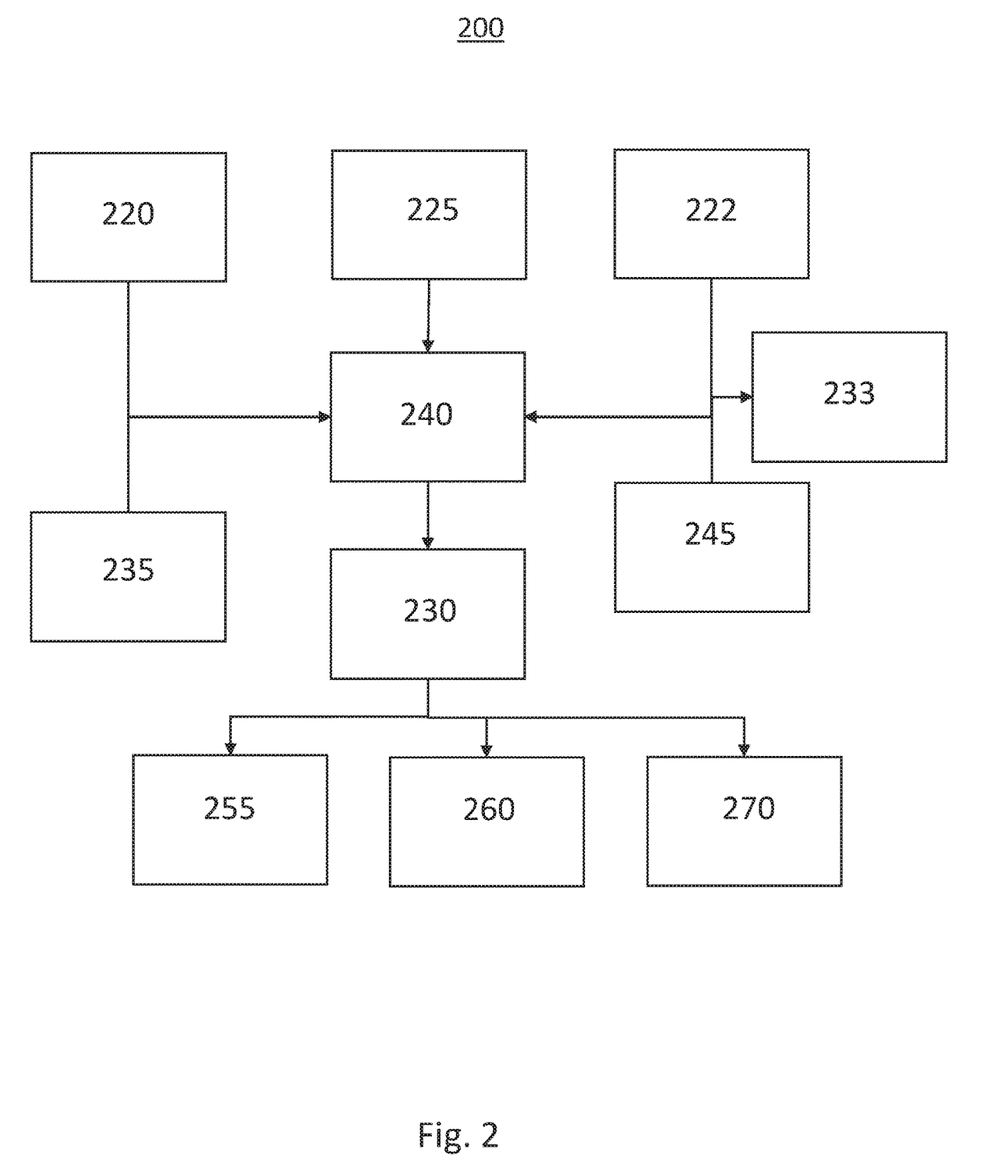
FIG. 2 shows a block diagram illustrating a system for real time lateral control and steering actuation assessment for a motor vehicle according to an exemplary embodiment.

Turning now to FIG. 2, a block diagram illustrating an exemplary implementation of a system for real time lateral control and steering actuation assessment for assisted driving 200 is shown. The system 200 includes a processor 240, a camera 220, a Lidar 222, a global positioning system (GPS) 225, an inertial measurement unit (IMU) 233, a user interface 235, a memory 245, a vehicle controller 230 a throttle controller 255, a brake controller 260 and a steering controller 270.

During operation, the system 200 is operative to use various sensors such as a camera 220 and Lidar 222 capable of identifying and locating roadway markers, proximate vehicles and other external objects. Sensor fusion algorithms provide accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. The identification and location of these objects and the surrounding environment may facilitate the creation of a three dimensional object map by the ADAS in order to control the vehicle in the changing environment.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected off of the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The user interface 235 may be a user input device, such as a display screen, light emitting diode, audible alarm or haptic seat located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired following distance for adaptive cruise operations, selection of vehicle motion profiles for assisted driving, etc. In response to a selection by the vehicle operator, the user interface 235 may be operative to couple a control signal or the like to the processor 240 for activation of the ADAS function. Further, the user interface may be operative to provide a user prompt or warning indicative of an upcoming potential disengagement event of the ADAS and/or a request for the user to take over control of the vehicle.

The IMU 233 is a device used to report a specific force of a body. The IMU 233 may measure angular or linear acceleration and may be used to determine a lateral acceleration, a longitudinal acceleration, a yaw rate and pitch of a vehicle. The IMU 233 is mounted within the host vehicle and is operative to generate a control signal indicative of the measured specific forces and to couple this control signal to the processor 240.

In this exemplary embodiment, the processor 240 is operative to perform the method for real time lateral control and steering actuation assessment in addition to other vehicle control operations. The processor is operative to receive signals from the camera 220, the GPS 225 and the Lidar 222 to generate a two or three dimensional representation of the proximate area around the host vehicle. The processor 240 may then be operative to identify undrivable areas within the representation of the proximate area. The undrivable areas may be identified in response to objects detected within the proximate area, temporary undrivable areas, such as construction sites, and undrivable areas of the roadway, such as soft shoulders.

In an exemplary embodiment, the processor 240 is operative to receive an initiation of an ADAS function in response to a signal from the user interface 235 or in response to a request from another ADAS function. The processor 240 is operative to determine a desired vehicle path in response to the initiation of the ADAS function. For example, if the ADAS function is a lane centering operation, the processor 240 is operative to determine a centerline of the current vehicle lane in response to the signal from the camera 225, GPS 225, and/or Lidar 222. The processor 240 is next operative to determine a control point wherein the host vehicle will join the desired vehicle path. The processor 240 is next operative to generate a host vehicle motion path between the host vehicle location and the control point. The processor 240 is further operative to generate control signals to couple to a vehicle controller 230 to control the motion of the host vehicle along the motion path.

The processor 240 is further operative to monitor a signal from the IMU 233 and to store measured acceleration values in the memory. The method is then operative to compare these measured acceleration values with theoretical lateral acceleration values to calculate 325 a lateral error. The lateral error is indicative of a deviation of the actual host vehicle path with the motion path. In an exemplary embodiment, the lateral may be indicative of inaccuracies in a steering controller 270, the vehicle controller 230 or a feedback controller.

The vehicle controller 230 may generate control signals for coupling to other vehicle system controllers, such as a throttle controller 255, a brake controller 260 and a steering controller 270 in order to control the operation of the vehicle in response to the ADAS algorithm and control signals from the processor 240. The vehicle controller may be operative to adjust the speed of the vehicle by reducing the throttle via the throttle controller 255 or to apply the friction brakes via the brake controller 260 in response to a control signals generated by the processor 240 in order to follow the motion path generated by the processor 240. The vehicle controller may be operative to adjust the direction of the vehicle controlling the vehicle steering via the steering controller 270 in response to a control signals generated by the processor 240.

Figure 3:
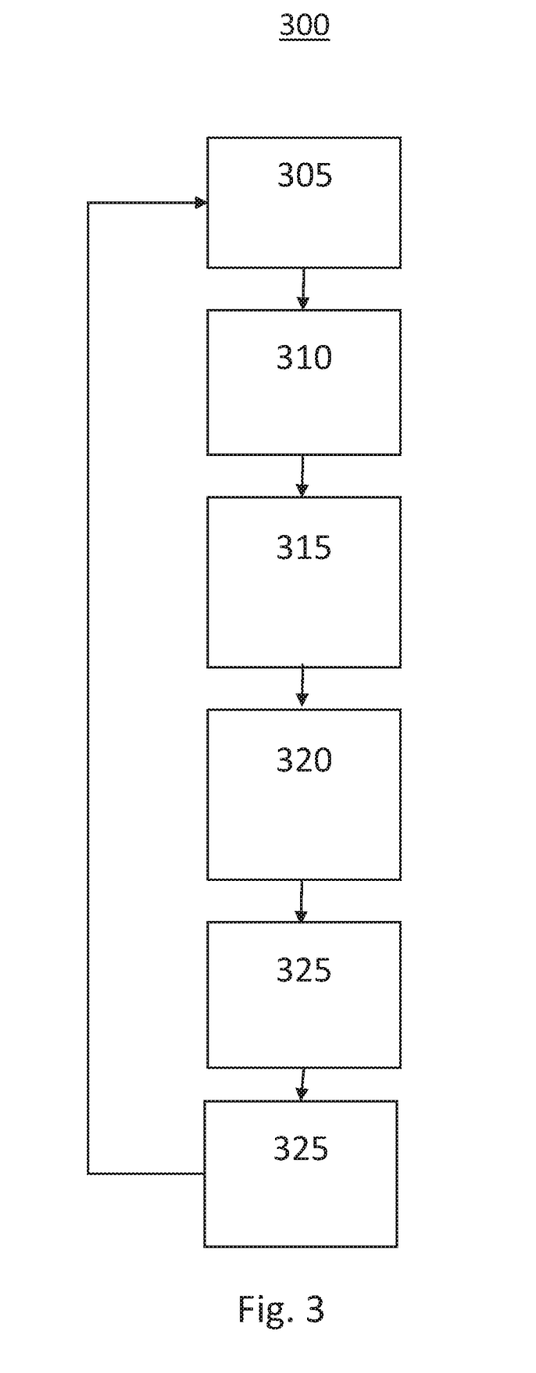
FIG. 3 shows a flow chart illustrating a method for real time lateral control and steering actuation assessment for a motor vehicle according to another exemplary embodiment.

Turning now to FIG. 3, a flow chart illustrating an exemplary implementation of a method for real time lateral control and steering actuation assessment for assisted driving 300 is shown. The method is during an ADAS operation or in response to initiation of an ADAS operation in response to a user or system request. The method is first operative to determine 305 a desired vehicle path. The desired vehicle path may be determined in response to a vehicle lane width, map data, current vehicle location, etc. For example, during an adaptive cruise control operation with lane centering, the desired vehicle path may be a centerline of a current vehicle lane. Alternatively, a desired vehicle path may include a vehicle lane centerline offset, such as 40 cm in one lateral direction.

The method is next operative to establish 310 a control point at which the host vehicle will join the desired vehicle path in a safe manner that is comfortable for any vehicle occupants. This control point may be established in response to a host vehicle speed, vehicle lane characteristics and host vehicle lateral distance to the desired vehicle path. For example, if the host vehicle is travelling at seventy miles per hour, the control point will be established at a distance further along the desired vehicle path from host vehicle than for a vehicle traveling at twenty miles per hour.

The method is next operative to generate 315 a motion path between the current host vehicle location and the control point. The motion path is generated in response to an ADAS control algorithm as a path for the vehicle to follow to align the vehicle with the desired vehicle path. The motion path may be generated in response to a number of waypoints between the current host vehicle location and the control point and may be dependent of vehicle speed, weather conditions, road conditions, occupancy of the host vehicle etc.

The method is next operative to control 320 the vehicle along the motion path. Control of the vehicle along the motion path may be performed by generating control signals to control a brake controller, steering controller and throttle controller in response to feedback from GPS sensors, cameras, lidar, radar and other sensors. During control of the vehicle along the motion path the method is operative to monitor an IMU output and to store measured acceleration values. The method is then operative to compare these measured acceleration values with theoretical lateral acceleration values to calculate 325 a lateral error. In an exemplary embodiment, the lateral travel may be calculated according to the following formulas $$\theta_{i+1} = \theta_i + \omega_{z_i} dt$$

$$y_{i+1} = y_i + v_{x_i} \sin(\theta_i) dt + v_{y_i} \cos(\theta_i) dt$$

where $\square$ is a yaw value and v are the directional velocities. The lateral error may then be determined in response to the difference between the lateral travel and the expected lateral travel.

In an exemplary embodiment, the method may further be operative to enable or disable 330 a set of ADAS functions in response to the lateral error or set a performance level for the ADAS functions in response to the lateral error value. For example, if the lateral error exceeds a certain threshold, the method may be operative to enable a lane centering operations, but disable a dynamic offset operation or limit the dynamic offset to a limited offset range, such as 20 cm. In response to a lateral error exceeding a threshold, trailering operations may be disabled or limited to a certain speed. The method may then be operative to return to determine 305 a subsequent desired path for a subsequent ADAS maneuver.

Figure 4:
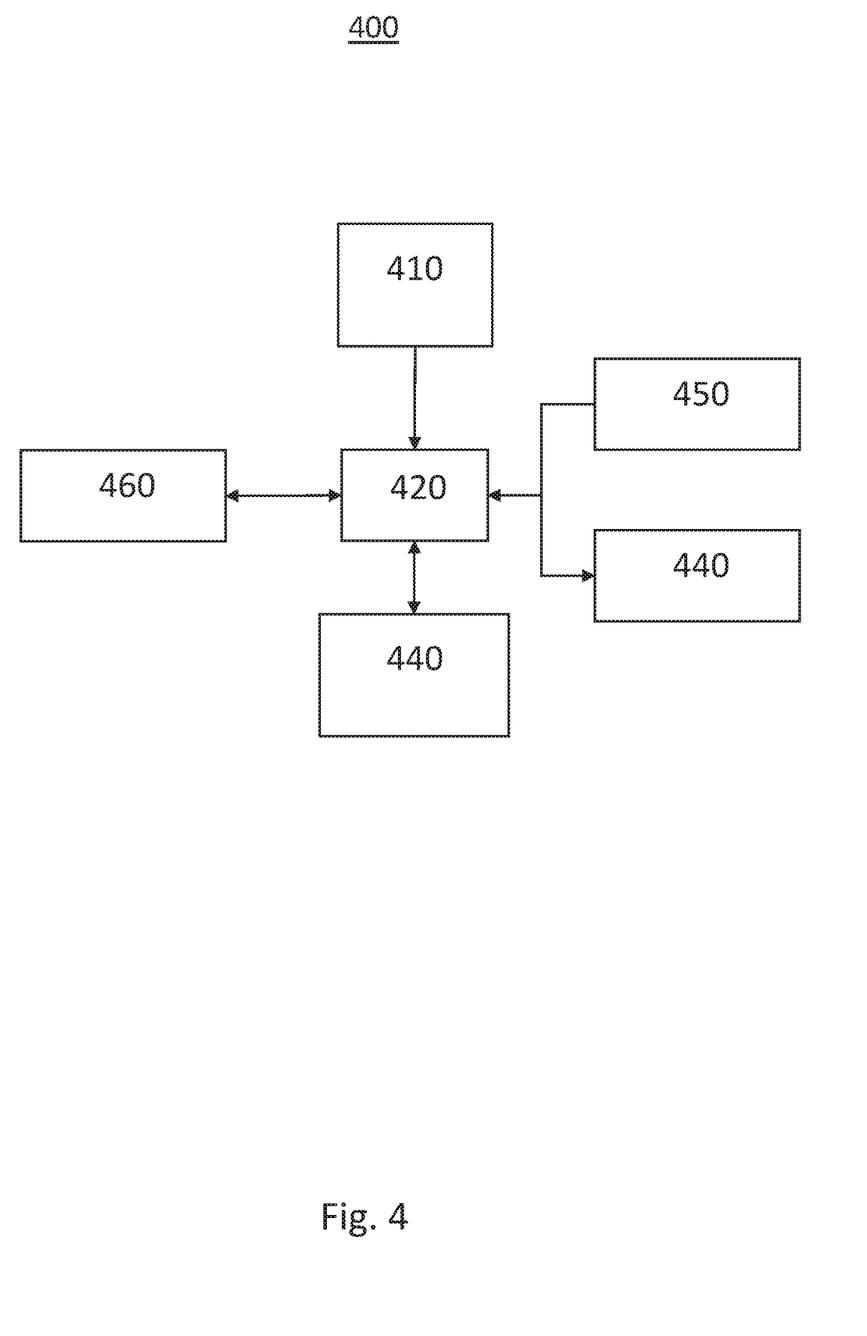
FIG. 4 shows a block diagram illustrating a system for real time lateral control and steering actuation assessment for a motor vehicle according to another exemplary embodiment.

Turning now to FIG. 4, a block diagram illustrating another exemplary implementation of a system 400 for real time lateral control and steering actuation assessment in a vehicle is shown. The system may be an advanced driver assistance system for controlling a host vehicle having a sensor 410, a processor 420, a vehicle controller 430, a memory 440 and an IMU 450.

The sensor 410 is operative to detect a vehicle lane marker and other objects, vehicles, and indicators within a field of view. In this exemplary embodiment, the sensor 410 is operative to detect vehicle roadway lane markers or other indicators within the field of view. In this exemplary embodiment, the sensor 410 may be a camera operative to capture an image and/or an operative to generate a point map of the field of view. The sensor 410 output may be processed using image processing techniques to detect a vehicle roadway lane marker and/or to estimate a location of the vehicle roadway lane marker. Alternatively, the sensor 410 may be a stereo imaging system, a lidar, a radar or the like.

The IMU 450 for measuring a measured acceleration of the host vehicle. The IMU 450 can detect and quantify lateral acceleration, longitudinal acceleration, yaw rate, and the like. The IMU 450 is operative to generate a control signal indicative of the measured accelerations by integrating a measured velocity and/or yaw rate and to couple this control signal to the processor 420. The processor 420 is operative to perform the ADAS algorithms in response to data from the sensor 410 and the IMU 450 and other host vehicle sensors and systems. The measured accelerations may be stored in the memory 440 for retrieval by the processor 420.

In this exemplary embodiment, the processor 420 is operative to establish a control point in response to a detected vehicle lane marker. The control point may be established in response to an initiation of an ADAS function, such as lane centering, or may be established in response to an operational requirement, such as a change from a lane centering operation to an offset lane following operation wherein the vehicle location is shifted from the center of the lane to a longitudinal centerline shifted by an offset, such as 40 cms. The processor 420 is further operative to generate a motion path between a current location of the host vehicle and the control point, and to generate a control signal indicative of the motion path to couple to the vehicle controller 430. The processor 420 then compares the measured acceleration of the host vehicle to a theoretical acceleration determined in response to the motion path to generate an error term in response to a difference between the theoretical acceleration and the measured acceleration. The error term is indicative of a difference between the desired motion path and the actual path taken by the host vehicle. A magnitude of the error term may be indicative of an extent of the deviation of the actual path and the desired motion path.

The processor 420 may be operative to enable and disable ADAS functions or to limit the scope of the ADAS function in response to the error term. For example, if the magnitude of the error term is low, indicative of a small variation between the actual and desired paths, all ADAS functions, such as lane centering, dynamic offset, lane change, trailering etc., may be enabled. If the error term is greater, a range of dynamic offset may be reduced or limited, a trailing maximum speed may be reduced, lane changes may only be enabled on straight roadways, etc. As the error term further increases, some of these ADAS functions may be disabled.

The vehicle controller 430 to control the host vehicle in response to the control signal from the processor 420 and the error term. The exemplary system may further include a memory 440 for storing a map data, the error term and ADAS availability indicators. The system may further include a user interface 460 operative to receive a user input and wherein the control point is established in response to the user input.

Figure 5:
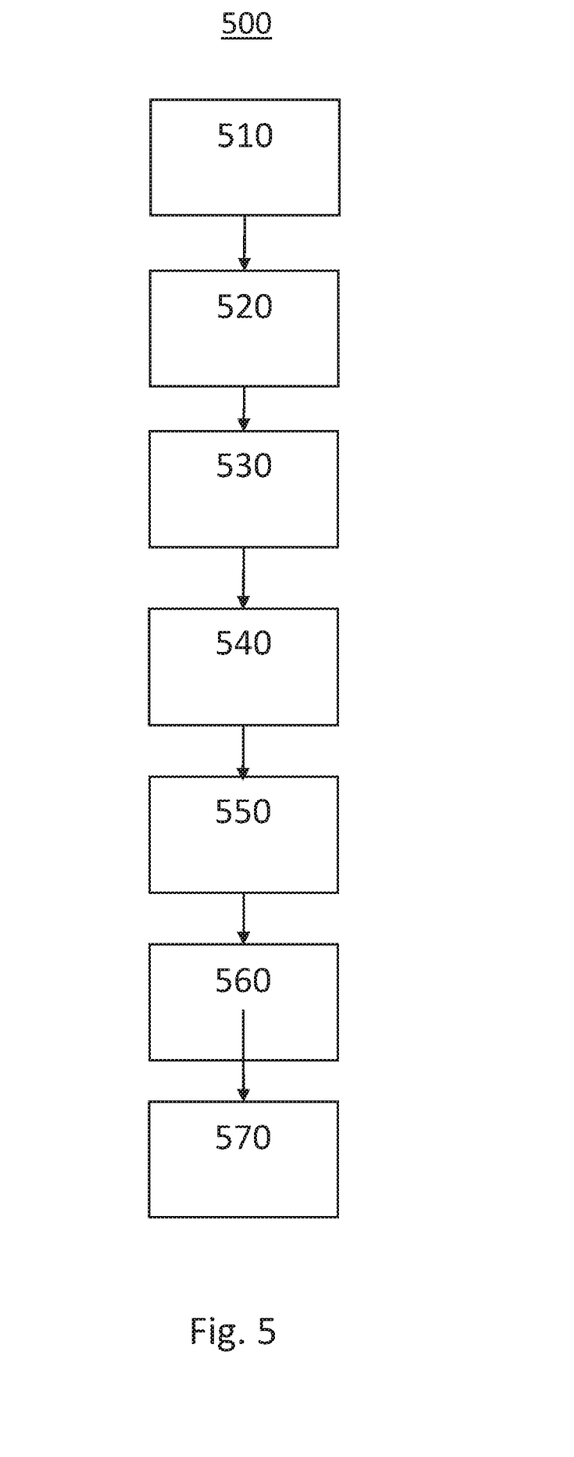
FIG. 5 shows a flow chart illustrating a method for real time lateral control and steering actuation assessment for a motor vehicle according to another exemplary embodiment.

Turning now to FIG. 5, a flow chart illustrating an exemplary implementation of a system 500 for real time lateral control and steering actuation assessment in a host vehicle is shown. The method is first operative to perform an ADAS function and to assess a vehicle control performance in response to the ADAS function control instructions. The method is operative to observe and quantify in real time the accuracy of the vehicle controller and the actuation system at following a motion path generated by the ADAS. The method is operative to observe a host vehicle movement over a time window, compares that movement to the motion path, and generates an error term indicative of a difference between the vehicle movement and the motion path.

In this exemplary embodiment, the method is first operative to determine 510 a desired host vehicle path in response to an ADAS system request. The desired host path may be determined in response to an initiation of an assisted driving function, such as an initiation of a lane centering operation. The method then establishes 520 a control point along the host vehicle path. The control point is the point wherein the host vehicle will join the desired host vehicle path. The method may detect a road lane marker and the desired host vehicle path is determined in response to the road lane marker. The control point may be determined in response to a host vehicle location and a host vehicle location. The method then generates 530 a motion path between a host vehicle location and the control point. The motion path may be generated in response to a host vehicle speed and location, environmental conditions, and/or a prior error term determination.

The method is next operative to calculate 540 a theoretical acceleration of the host vehicle along the motion path. The theoretical acceleration are the acceleration forces expected on a theoretical host vehicle for the same velocity and motion path. The method then controls 540 the host vehicle along the motion path. During the host vehicle control along the motion path, the method is operative for receiving 550 a measured acceleration from an inertial measurement unit within the host vehicle. These measured accelerations may be received periodically along the motion path. The method is then operative for generating 560 an error term in response to a comparison of the theoretical acceleration and the measured acceleration. The method may then be further operative for controlling 570 the host vehicle along the desired host vehicle path in response to the error term.

In an exemplary embodiment, the error term may be indicative of a difference between the motion path and an operation path performed by the host vehicle. Alternatively, the error term may be determined in response to a plurality of measured accelerations and a plurality of theoretical accelerations along the motion path. An assisted driving function is disabled in response to the error term or the method may be further operative to generate a driver take over request in response to the error term. A driver take over request is when the ADAS initiates a request to a driver to resume control of the vehicle before an ADAS system is disengaged. A take over request may be generated in response to approaching a construction site, accident site, merging, etc. In a further exemplary embodiment, them method may be operative to prevent an assisted driving operation from being initiated in response to the error term, such as a trailering operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a sensor to detect a vehicle lane marker;
an inertial measurement unit for measuring a measured acceleration of a host vehicle;
a processor configured to perform a set of assisted driving operations, to establish a control point in response to the vehicle lane marker, to generate a motion path between a current location of the host vehicle and the control point, and to generate a control signal indicative of the motion path to couple to a vehicle controller, the processor being further operative to compare the measured acceleration of the host vehicle along the motion path to a theoretical acceleration of the host vehicle along the motion path, to generate an error term in response to a difference between the measured acceleration and the theoretical acceleration, and to disable a first subset of the set of assisted driving operations and to limit a second subset of the set of assisted driving operations in response to the error term exceeding a threshold; and
the vehicle controller to control the host vehicle in response to the control signal and the error term.

2. The apparatus of claim 1 wherein the processor is further operative to prevent the first subset of the set of assisted driving operations from being initiated in response to the error term exceeding the threshold.

3. The apparatus of claim 1 wherein the sensor is a camera mounted to the host vehicle.

4. The apparatus of claim 1 wherein the processor is further operative to determine a centerline of a vehicle lane and the control point is established on the centerline.

5. The apparatus of claim 1 wherein the error term is determined in response to a plurality of measured velocities and a plurality of motion paths.

6. The apparatus of claim 1 wherein the processor is operative to perform a lane centering assisted driving function.

7. A method performed by a processor configured to perform a set of assisted driving operations comprising:
  determining a host vehicle path;
  establishing a control point along the host vehicle path;
  generating a desired motion path between a host vehicle location and the control point;
  controlling a host vehicle in response to the desired motion path;
  receiving a measured acceleration from an inertial measurement unit within the host vehicle;
  determining an actual motion path in response to the measured acceleration;
  generating an error term in response to a comparison of the desired motion path and the actual motion path; and
  disabling a first subset of the set of assisted driving operations and to limit a second subset of the set of assisted driving operations-in response to the error term exceeding a threshold.

8. The method of claim 7 wherein the error term is indicative of a difference between the desired motion path and an operation path performed by the host vehicle.

9. The method of claim 8 wherein the desired motion path is determined in response to an initiation of an assisted driving function.

10. The method of claim 7 wherein the desired motion path is determined in response to an initiation of a lane centering operation.

11. The method of claim 7 further including generating a driver take over request in response to the error term.

12. The method of claim 7 wherein the error term is determined in response to a plurality of measured accelerations along the actual motion path and a plurality of theoretical accelerations along the desired motion path.

13. The method of claim 7 further including preventing an assisted driving operation from being initiated in response to the error term.

14. The method of claim 7 further including detecting a road lane marker and wherein the desired motion path is determined in response to the road lane marker.

15. The method of claim 7 wherein the control point is determined in response to the host vehicle location.

16. The method of claim 7 wherein the desired motion path is determined in response to a prior error term.

17. An advanced driver assistance system for performing a set of assisted driving operations for controlling a host vehicle comprising:
  a user interface for receiving a user input and displaying a user warning;
  a camera for capturing an image including a vehicle lane indicator;
  an inertial measurement unit to measure a first host vehicle acceleration and a second host vehicle acceleration;
  a vehicle controller for controlling the host vehicle along a motion path in response to a control signal; and
  a processor for generating the motion path, for generating the control signal representative of the motion path, for estimating a first theoretical acceleration and a second theoretical acceleration for the host vehicle along the motion path, for receiving the first host vehicle acceleration and the second host vehicle acceleration and for generating an error term in response to the first theoretical acceleration, the second theoretical acceleration, the first host vehicle acceleration and the second host vehicle acceleration, the processor being further operative to disable a first subset of the set of assisted driving operations and to limit a second subset of the set of assisted driving operations in response to the error term exceeding a threshold value.

18. The advanced driver assistance system for controlling the host vehicle of claim 17 wherein the motion path is generated in response to performing one of the set assisted driving operations.

* * * * *